(12) United States Patent
Frisch

(10) Patent No.: US 9,212,074 B2
(45) Date of Patent: Dec. 15, 2015

(54) ANOXIC MEMBRANE FILTRATION SYSTEM AND WATER TREATMENT METHOD

(75) Inventor: Samuel Frisch, Manalapan, NJ (US)

(73) Assignee: ENVIROGEN TECHNOLOGIES, INC., Kingwood, TX (US)

( * ) Notice: Subject to any disclaimer, the term of this patent is extended or adjusted under 35 U.S.C. 154(b) by 67 days.

(21) Appl. No.: 14/003,597

(22) PCT Filed: Mar. 8, 2012

(86) PCT No.: PCT/US2012/028154
§ 371 (c)(1),
(2), (4) Date: Nov. 11, 2013

(87) PCT Pub. No.: WO2012/122322
PCT Pub. Date: Sep. 13, 2012

(65) Prior Publication Data
US 2014/0054219 A1    Feb. 27, 2014

Related U.S. Application Data

(60) Provisional application No. 61/451,345, filed on Mar. 10, 2011.

(51) Int. Cl.
*C02F 3/30* (2006.01)
*C02F 3/28* (2006.01)
*C02F 1/44* (2006.01)
*C02F 3/08* (2006.01)

(52) U.S. Cl.
CPC .............. *C02F 3/2853* (2013.01); *C02F 3/301* (2013.01); *C02F 1/44* (2013.01); *C02F 3/085* (2013.01); *C02F 2209/04* (2013.01); *Y02W 10/15* (2015.05)

(58) Field of Classification Search
CPC .. C02F 3/06; C02F 2101/106; C02F 2209/04; C02F 3/2853; C02F 3/301
See application file for complete search history.

(56) References Cited

U.S. PATENT DOCUMENTS

| | | | | |
|---|---|---|---|---|
| 5,733,456 A | * | 3/1998 | Okey et al. | 210/605 |
| 6,616,843 B1 | * | 9/2003 | Behmann et al. | 210/605 |
| 6,719,903 B1 | * | 4/2004 | Pressley et al. | 210/613 |
| 6,755,977 B2 | * | 6/2004 | Brunsell | 210/648 |
| 7,303,677 B2 | * | 12/2007 | Cote et al. | 210/615 |
| 8,071,055 B2 | | 12/2011 | Newcombe | |
| 2003/0201225 A1 | * | 10/2003 | Josse et al. | 210/605 |
| 2004/0007527 A1 | * | 1/2004 | Pedersen et al. | 210/650 |

(Continued)

OTHER PUBLICATIONS

International Search Report dated Jun. 19, 2012, application No. PCT/US 12/28154.

*Primary Examiner* — Chester Barry
(74) *Attorney, Agent, or Firm* — RatnerPrestia

(57) ABSTRACT

A system is provided for treating contaminated water. The system includes a bioreactor having an outlet for treated water and a filter coupled to receive treated water from the outlet of the bioreactor. The filter is configured to operate in an anoxic mode. The filter has: (a) a vessel configured to receive the treated water, (b) a membrane associated with the vessel and positioned to extract permeate from the received water, (c) a fluid outlet positioned to direct fluid toward the membrane to inhibit film build up on the membrane, (d) a fluid recirculator positioned to recirculate fluid between the vessel and the fluid outlet, and (e) an oxidant supply positioned to introduce an oxidant into the vessel, the oxidant supply being adjustable to control the oxidation-reduction potential of the received water in the vessel within a predetermined range.

31 Claims, 5 Drawing Sheets

(56) References Cited

U.S. PATENT DOCUMENTS

| | | | |
|---|---|---|---|
| 2006/0000768 A1* | 1/2006 | Miklos | 210/605 |
| 2006/0272198 A1* | 12/2006 | Yoon et al. | 43/87 |
| 2007/0108125 A1* | 5/2007 | Cho et al. | 210/605 |
| 2007/0114174 A1* | 5/2007 | Peeters et al. | 210/605 |
| 2009/0045135 A1 | 2/2009 | Khudenko et al. | |
| 2010/0200500 A1* | 8/2010 | Rezania et al. | 210/614 |
| 2011/0186513 A1* | 8/2011 | Vuong et al. | 210/636 |
| 2012/0187042 A1* | 7/2012 | Coleman | 210/605 |

\* cited by examiner

ANOXIC MEMBRANE FILTRATION SYSTEM AND WATER TREATMENT METHOD

CROSS REFERENCE TO RELATED APPLICATIONS

This application is the U.S. National Phase application of PCT International Application No. PCT/US2012/028154, filed Mar. 8, 2012, and claims priority to provisional application No. 61/451,345, filed Mar. 10, 2011, which applications are incorporated herein by reference in their entireties and for all purposes.

BACKGROUND OF THE INVENTION

Systems are known for the treatment of contaminated water such as ground water, surface water, pretreated water, and industrial waste water. For example, media filtration systems and membrane filtration systems are often used for such treatment processes. Despite efforts to design water treatment systems capable of removing contaminants such as dissolved contaminants, there remains a demand for systems that are improved in terms of at least one of their efficacy, efficiency (including reduced size), and cost.

SUMMARY OF THE INVENTION

According to one aspect of this invention, a system is provided for treating contaminated water for the removal of dissolved contaminants. The system includes a bioreactor having an outlet for treated water and a filter coupled to receive treated water from the outlet of the bioreactor. The filter is configured to operate in an anoxic mode to control the oxidation-reduction potential of the treated water. The filter has:

(a) a vessel configured to receive the treated water, (b) a membrane associated with the vessel and positioned to extract permeate from the received water, (c) a fluid outlet positioned to direct fluid toward the membrane to inhibit film build up on the membrane, (d) a fluid recirculator positioned to recirculate fluid between the vessel and the fluid outlet, and (e) an oxidant supply positioned to introduce an oxidant into the vessel, the oxidant supply being adjustable to control the oxidation-reduction potential of the received water in the vessel within a predetermined range.

The bioreactor is optionally a liquid bioreactor, which can be a fluidized bioreactor or a fluidized bed reactor. The bioreactor is optionally configured to operate in an anoxic mode.

According to another aspect of this invention, a filtration system for removing dissolved contaminants from contaminated water is provided. The filtration system includes:

(a) a vessel configured to receive the contaminated water;

(b) a membrane associated with the vessel and positioned to extract permeate from the received water;

(c) a fluid outlet positioned to direct fluid toward the membrane to inhibit film build up on the membrane;

(d) a fluid recirculator positioned to recirculate fluid between the vessel and the fluid outlet; and (e) an oxidant supply positioned to introduce an oxidant into the vessel, the oxidant supply being adjustable to control the oxidation-reduction potential of the received water in the vessel;

wherein the filter is configured to operate in an anoxic mode to control the oxidation-reduction potential of the received water within a predetermined range.

The filtration system can be configured to remove dissolved selenium from the received water and to maintain the predetermined range of oxidation-reduction potential at −100 to −300 mV, and it can include a sensor positioned to measure the oxidation-reduction potential representative of that of the received water in the vessel. The sensor can be positioned to measure the oxidation-reduction potential in the permeate or in the received water. The oxidant supply of the filtration system can be configured to introduce an oxidant gas, such as air, into the vessel.

The membrane is optionally an internal membrane positioned at least partially within the vessel or an external membrane positioned outside of the vessel. The fluid outlet can be positioned to induce cross flow of received water to reduce degradation of the permeability of the membrane. Also, the fluid recirculator can be configured to recirculate fluid including gas from a headspace above the received water in the vessel. The filtration system's vessel can include an inlet for receiving an electron donor and an inlet for receiving a nutrient. Also, the vessel can be a mixed vessel and a bioreactor.

The fluid outlet can be configured to direct a gas toward the membrane to inhibit film build up on the membrane, and the fluid recirculator is optionally configured to recirculate gas between the vessel and the fluid outlet. Alternatively, the fluid outlet can be configured to direct received water toward the membrane to inhibit film build up on the membrane water, and the fluid recirculator is optionally configured to recirculate received water between the vessel and the fluid outlet.

According to yet another aspect of this invention, a method is provided for removing dissolved contaminants from contaminated water. The method includes the steps of:

(a) receiving contaminated water in a vessel;

(b) separating or extracting permeate from the received water using a membrane associated with the vessel;

(c) directing fluid toward the membrane to inhibit film build up on the membrane from a fluid outlet;

(d) recirculating fluid between the vessel and the fluid outlet; and (e) maintaining an anoxic mode in the vessel to control the oxidation-reduction potential of the received water within a predetermined range by controlling the introduction of an oxidant to control the oxidation-reduction potential of the received water as needed.

The receiving step (a) can include receiving treated water from a bioreactor. The directing step (c) can include cross flow of received water to reduce degradation of the permeability of the membrane. The recirculating step (d) can include recirculating fluid including gas from a headspace above the received water in the vessel. If the method is configured for removing dissolved selenium from the received water, the maintaining step (e) optionally includes maintaining the predetermined range of oxidation-reduction potential of −100 to −300 mV.

The maintaining step (e) can include measuring an oxidation-reduction potential representative of that of the received water and adjusting the introduction of the oxidant to maintain the predetermined range of oxidation-reduction potential. Specifically, the maintaining step (e) can include measuring the oxidation-reduction potential of the received water of the permeate.

DETAILED DESCRIPTION OF THE INVENTION

Figure 1:
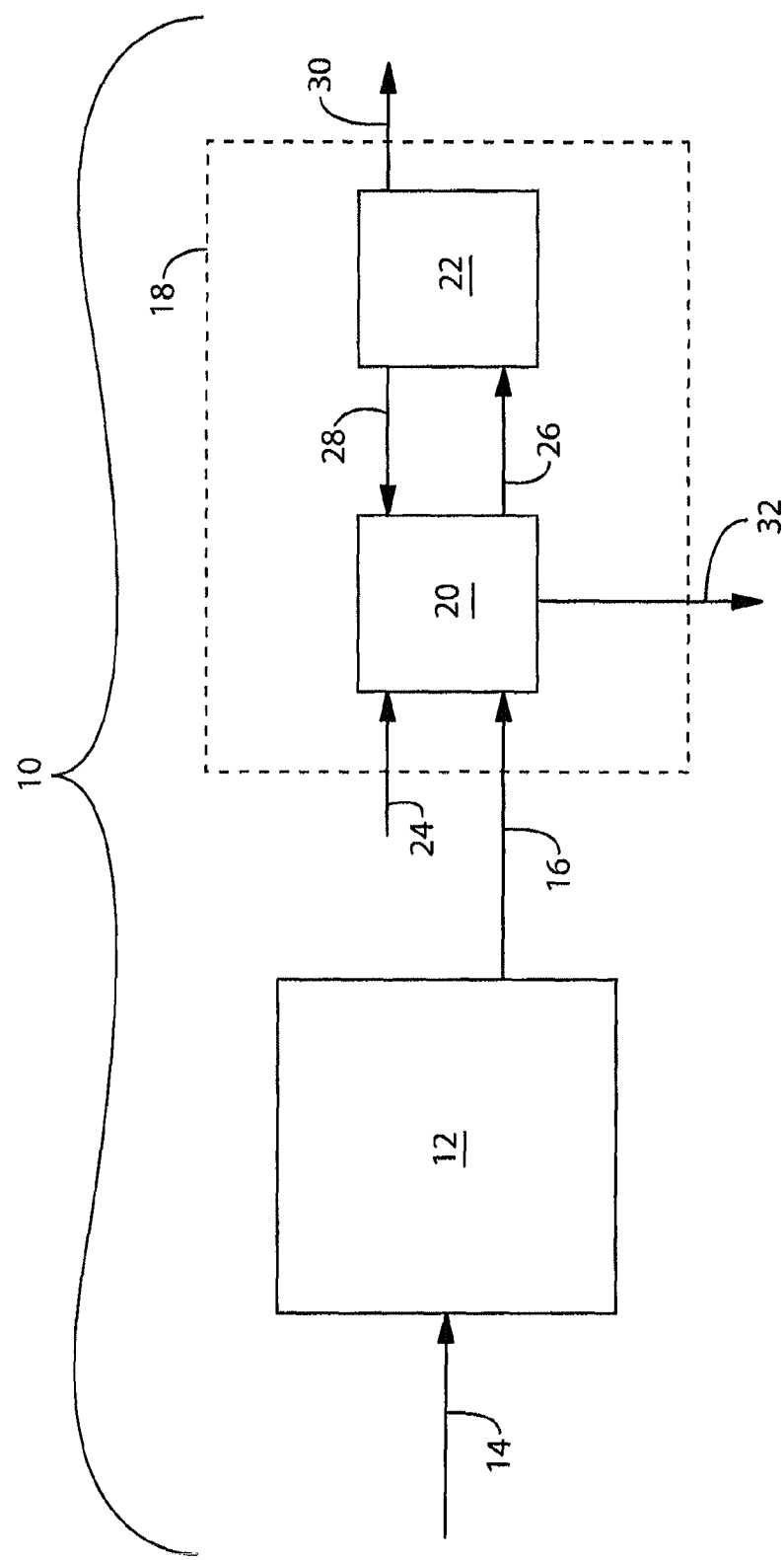
FIG. 1 is a block schematic diagram of an embodiment of a system for treating contaminated water for the removal of dissolved contaminants.

Although the invention is illustrated and described herein with reference to specific embodiments, the invention is not intended to be limited to the details shown. Rather, various modifications may be made in the details within the scope and range of equivalents of the claims and without departing from the invention.

Media filtration systems (e.g., using sand, multimedia, cartridges, bags, etc.) may be used to filter waste water when it is possible to overcome their tendency to plug, to increase their filtration efficiency, to control the water ORP (oxidation reduction potential), or to effectively polish COD, BOD, TOC, excessive backwash waste volumes or disposables. Additionally or alternatively, membrane filtration systems may be used to filter waste water.

Typical contaminants that may be removed in this process include, for example, excess electron donor chemical (such as EOS microCg™, molasses, corn syrup, acetic acid, or ethanol) from an upstream anoxic biological process, selenium, hexavalent chrome, COD, BOD, TOC, and/or TSS.

Membrane filtration systems may be classified based on the means of controlling film build-up and flux on the membrane surfaces. In aqueous systems, for example, the membrane surface may be scoured by water (or water containing suspended solids). Examples of water-scoured membranes include tubular, spiral wound, flat sheet or hollow fiber membranes such as those manufactured by Koch Membrane Systems, Inc. or by Rhodia. The membrane surface may also be scoured by gas. For example, air may be used as the scouring gas. Examples of gas- or air-scoured membranes include flat sheet, hollow fiber, or tubular membranes such as those manufactured by Kubota Corporation, Mitsubishi Rayon Company Ltd., Norit X-Flow, and GE Power and Water. Preferred membranes include internal flat sheet or hollow fiber membranes that are gas scoured. These are manufactured by Kubota Corporation (flat sheet), Mitsubishi Rayon Company (hollow fiber), and GE Power and Water (hollow fiber).

Air or gas scoured membranes may be of the internal or the external type and are generally used in aerobic applications for drinking water purification and for waste treatment. These membranes may have lower energy consumption and lower capital and operating costs as compared to water-scoured membranes. In waste treatment applications, these membranes may be employed in MBR (membrane bioreactor) systems in an aerobic mode. Frequently, the air supplied to the membranes has the multiple functions of membrane surface scouring, water aeration, and bioreactor mixing.

It is preferred, according to exemplary embodiments of this invention, to utilize gas-scoured membranes in a controlled anoxic mode and in an anoxic membrane bioreactor downstream of an anoxic bioreactor or, more preferably, downstream of an FBR. In such anoxic mode, the water undergoing treatment is substantially depleted of dissolved $O_2$.

Embodiments of this invention are especially effective when used in conjunction with an FBR bioreactor for the treatment of selenium. Specifically, the FBR is believed to be very effective in treatment of waters containing dissolved selenium. Selenium in feed water may be in any of several forms, including selenate, selenite, or as an organic selenium compound. These forms of selenium are generally water soluble at concentrations well above required treatment levels. For example, recent treatment requirements may call for treatment to less than 5 ppb Se. Biological removal of Se can be performed using a feed of an electron donor (e.g., carbon substrate) chemical and nutrients (e.g., N and P) as required. Examples of electron donors can include, for example, EOS MicroCg, molasses, acetic acid, ethanol, methanol, benzoate, corn syrup, and lactate.

As water passes through an anoxic bioreactor, any oxygen and nitrate present in the feed are fully consumed or taken up by biomass or converted to $CO_2$ and nitrogen gas. In the process, the water ORP is reduced to a controlled value based on the amount of electron donor added. Selenium is thereby converted to an insoluble form. Generally this is believed to be elemental selenium or selenium that is taken up by biomass. It has been discovered that effective treatment for removal of selenium depends on filtration of the bioreactor effluent in an anoxic mode because re-aeration of the feed, or adding an oxidant that will increase ORP, may re-dissolve the Se rendering it un-filterable as a solid.

The bioreactor effluent typically contains some amount of COD, BOD and TOC, with the specific concentration depending on several factors including the choice of electron donor chemical and the size (HRT) and efficiency of the bioreactor. In some cases, the amount of dissolved COD, BOD or TOC in the bioreactor effluent may exceed the effluent requirement, necessitating further treatment. Such a COD, BOD and TOC polishing step may be performed as a separate step following anoxic filtration or in a single step using a controlled anoxic membrane bioreactor.

It has been discovered to be advantageous to control an anoxic mode of operation. In an uncontrolled anoxic mode of operation, the consumption of residual COD, BOD and TOC may result in the production of $H_2S$ gas and/or methane. This may be undesirable because of odors, safety concerns, and the possible need for explosion hazard controls. Additionally, it is expected that the rate of COD, BOD and TOC reduction and the required polishing bioreactor size are reduced in a controlled mode of operation.

The preferred means of ORP control is the addition of a controlled amount of air or other oxidant to the bioreactor so as to maintain ORP within an optimal predetermined range (e.g., −100 to −300 mV in the case of treatment for removal of selenium). The oxidant may be any suitable fluid. For example, the oxidant may be air or oxygen or ozone when a gaseous oxidant is employed. The oxidant may also be in liquid form (e.g., hydrogen peroxide).

For example, target or typical ORP ranges for contaminants may be as follows:

hexavalent chrome removal—ORP: 0-(−200);
Se: (−100)-(−300);
perchlorate: 0-(−200); and
Nitrate: (50)-(−150).

Regarding ORP sensing, a wide variety of ORP sensors can be used. For example, Walchem Corporation provides a WPH series of ORP analyzers and sensors, and the Rosemount Division of Emerson Process Management provides a Model 1056 Analyzer and a Model 3500 pH/ORP Sensor.

The size and shape of the vessel that contains the membrane is preferably selected so as to promote mixing and mass transfer within the bio-suspension. This differs from alternative applications where oxygen dissolution may be of prime importance in aerobic systems.

Permeate flow from the filtration system may be motivated by gravity or by pumping. Additionally, membrane operations optionally include intermittent back flushes (with or without cleaning chemicals such as citric acid, sodium hypochlorite, or sodium hydroxide) and relaxation periods (e.g., stopping permeation).

ORP may be measured in the vessel, in the permeate, or in-line in a pumped loop into and out of the vessel. The latter arrangement has the advantage of high flow across the probe that helps to keep it clean. Also, multiple ORP probes may be used so that the operators and system controls have improved assurance of the accuracy of the reading (i.e., redundancy).

It has been discovered that the use of recirculated bioreactor headspace air (as opposed to solely using fresh air) in the MBR helps to prevent re-solubilization of Se. Because any oxygen will typically be consumed by biomass in the MBR, the head space gas is expected to consist predominantly of nitrogen with small amounts of $CO_2$ and $H_2S$.

According to exemplary embodiments of the invention, the system may be employed in two stages for further reduction of waste solids volume. The second stage could be employed to treat the sludge discharge from the first stage and would therefore be expected to have a much smaller size. Permeate from both stages could be discharged as treated water. Underflow from the second stage could be further dewatered using conventional means. Liquid from the final dewatering operation may be recovered into the front end of a primary bioreactor if required to remove any Se that has re-dissolved. This could result in a net zero liquid discharge system.

Referring now specifically to FIG. 1, a treatment system 10 is provided for removing dissolved contaminants from contaminated waste water. The treatment system 10 generally includes a bioreactor 12 and a filtration system 18 in upstream and downstream relationship, respectively. The bioreactor 12 is configured to receive waste water 14 from a source of contaminated waste water. Bioreactor 12 then supplies bioreactor outlet feed 16 for downstream treatment by filtration system 18.

Although bioreactor 12 is included in system 10, the bioreactor 12 may be eliminated. For example, filtration system 18 may receive water to be treated directly from a source other than a bioreactor 12. Specifically, it can receive water-to-be-treated from a wide variety of feed sources including groundwater, surface water, and industrial waste water. Alternatively, it can be pretreated water as well or some combination of liquids.

Filtration system 18 includes a vessel 20 configured to contain treatment water 16 and a filter 22 configured to filter the water 16. Treated water 16 from bioreactor 12 is introduced into the vessel 20. A controlled supply of air 24 is also introduced into vessel 20 as an oxidant. Fluid 26 flows from vessel 20 to filter 22 and is recirculated as fluid 28 returning to the vessel 20 from the filter 22. From the filter 22, permeate 30 is removed. Waste sludge 32 is removed from the vessel 20.

The vessel 20 and filter 22 of filtration system 18 can have a wide variety of configurations. For example, filter 22 can be positioned within the vessel 20. Alternatively, it can be positioned external of the vessel 20. In either such configuration, fluid 26, 28 is preferably recirculated between the vessel 20 and the filter 22, thus helping to maintain an anoxic condition of the water within the vessel 20. Also, the controlled supply of air 24 is introduced continuously or periodically in a limited amount in order to maintain the anoxic mode within the filtration system 18. Although further details will be provided later, it will be appreciated that the recirculation of fluid 26 and 28 such as gas or liquid to scour a filter membrane, coupled with limited and controlled introduction of air 24, renders it possible to control the oxidation-reduction potential of the water contained within the vessel 20.

Referring generally to FIGS. 2 to 5, filtration system embodiments 100, 200, 300, 400 are provided for removing dissolved contaminants from contaminated water. The filtration systems 100, 200, 300, 400 include a vessel 102, 202, 302, 402 configured to receive the contaminated water; a membrane 106, 206, 306, 406 associated with the vessel 102, 202, 302, 402 and positioned to extract permeate 108, 208, 308, 408 from the received water 104, 204, 304, 404; a fluid outlet positioned to direct fluid toward the membrane 106, 206, 306, 406 to inhibit film build up on the membrane 106, 206, 306, 406; a fluid recirculator 112, 212, 312, 403 positioned to recirculate fluid between the vessel 102, 202, 302, 402 and the fluid outlet; and an oxidant supply 114, 214, 314, 414 positioned to introduce an oxidant into the vessel 102, 202, 302, 402, the oxidant supply being adjustable to control the oxidation-reduction potential of the received water 104, 204, 304, 404 in the vessel 102, 202, 302, 402. The filter is configured to operate in an anoxic mode to control the oxidation-reduction potential of the received water 104, 204, 304, 404 within a predetermined range.

In operation, contaminated water is received in a vessel 102, 202, 302, 402; permeate 108, 208, 308, 408 is separated or extracted from the received water 104, 204, 304, 404 using a membrane 106, 206, 306, 406 associated with the vessel 102, 202, 302, 402; fluid is directed toward the membrane 106, 206, 306, 406 to inhibit film build up on the membrane 106, 206, 306, 406 from a fluid outlet; fluid is recirculated between the vessel 102, 202, 302, 402 and the fluid outlet; and an anoxic mode is maintained in the vessel to control the oxidation-reduction potential of the received water 104, 204, 304, 404 within a predetermined range by controlling the introduction of an oxidant to control the oxidation-reduction potential of the received water 104, 204, 304, 404 as needed.

Figure 2:
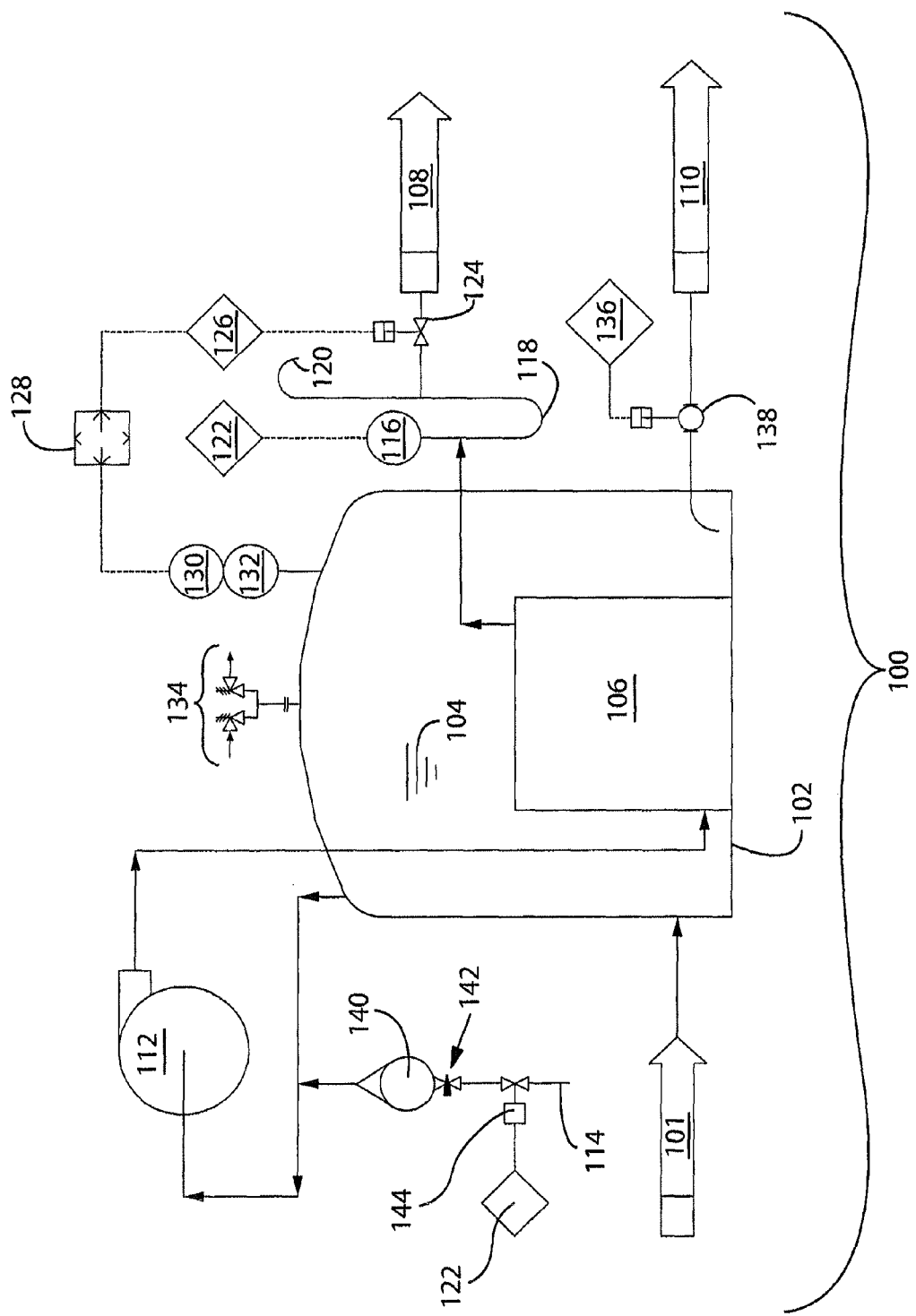
FIG. 2 is a schematic diagram of an embodiment of a filtration system for removing dissolved contaminants from contaminated water.

Referring specifically to FIG. 2, a filtration system 100 according to one exemplary embodiment of the invention is illustrated. Filtration system 100 includes a vessel 102 configured to contain water 104 undergoing treatment. Filtration system 100 also includes a membrane 106, which in this embodiment is positioned within the interior of the vessel 102.

Generally, the filtration system 100 is configured to deliver outputs in the form of permeate 108 and waste sludge 110. Also, the vessel 102 of filtration system 100 is configured to receive water 101 to be treated from either a source of waste water or a pre-treatment such as by a bioreactor.

A gas recirculator 112, such as a membrane surface sheer blower, is provided to recirculate gas from the vessel 102 to the membrane 106. That gas is used in order to scour the membrane 106 or at least to inhibit the accumulation of film on the membrane 106 during operation of the filtration system 100. An air supply 114 is provided in order to provide controlled air supply into the gas flow path so that it can be introduced into the filtration system 100 via the gas recirculator 112.

An oxidation-reduction potential (ORP) sensor 116 is provided to sense or measure the ORP of permeate 108, which ORP is representative of the ORP of the received water 104 within the vessel 102. A loop seal 118 may be provided at the outlet to protect against reverse flow of air or gas into the vessel 102. Also, a vent 120 may be provided in conjunction with the loop seal 118 in order to vent out gases to help maintain the seal and to facilitate flow of permeate away from the system.

Coupled to the ORP sensor 116 is a connection 122 to an air feed controller. Also, a permeate flow control valve 124 is provided in order to control the flow of permeate from the filtration system 100. A connection 126 is provided to a tank level control via a level control 128, a level indicating and transmitting device 130, and a level element 132. This assembly permits the control of the level of received water 104 in the vessel 102 by adjusting the withdrawal rate or flow of permeate 108 from the filtration system 100. Level control within the vessel may be accomplished in many ways including by means of mechanical float valves, adjustment of permeate flow, and/or adjustment of vessel feed flow. Additionally, a pressure and vacuum relief 134 is provided at the top of the vessel 102 in order to release excessive pressure or vacuum, thus protecting the integrity of the vessel 102.

A desludging valve control connection 136 is provided in conjunction with a desludging valve 138 in order to control the withdrawal of waste sludge 110 from the filtration system 100. The desludging valve 138 is optionally controlled based with the use of a feed totalizer on the feed line, which can be opened in direct proportion to the feed volume. Alternatively or additionally, the desludging valve can operate in response to a measurement of solids concentration. The waste sludge 110 generally includes suspended solids and biomass, and the waste sludge 110 can be treated further in a downstream system. Similarly, permeate 108 can be treated downstream by further polishing or other treatment techniques.

In connection with the recirculation of gas between the vessel 102 and the membrane 106, a flow meter 140, together with a needle valve 142 for fixing the air flow rate, meters the flow of air into the recirculation path upstream of the gas recirculator 112. A control valve 144, such as an on-off solenoid control valve, is provided in order to control the flow of air from the air supply 114 into the filtration system 100. Alternate means of oxidant flow, either continuous or intermittent, may be used. A connection at 122 is provided to the air feed controller referred to previously in relation to the ORP 116.

Figure 3:
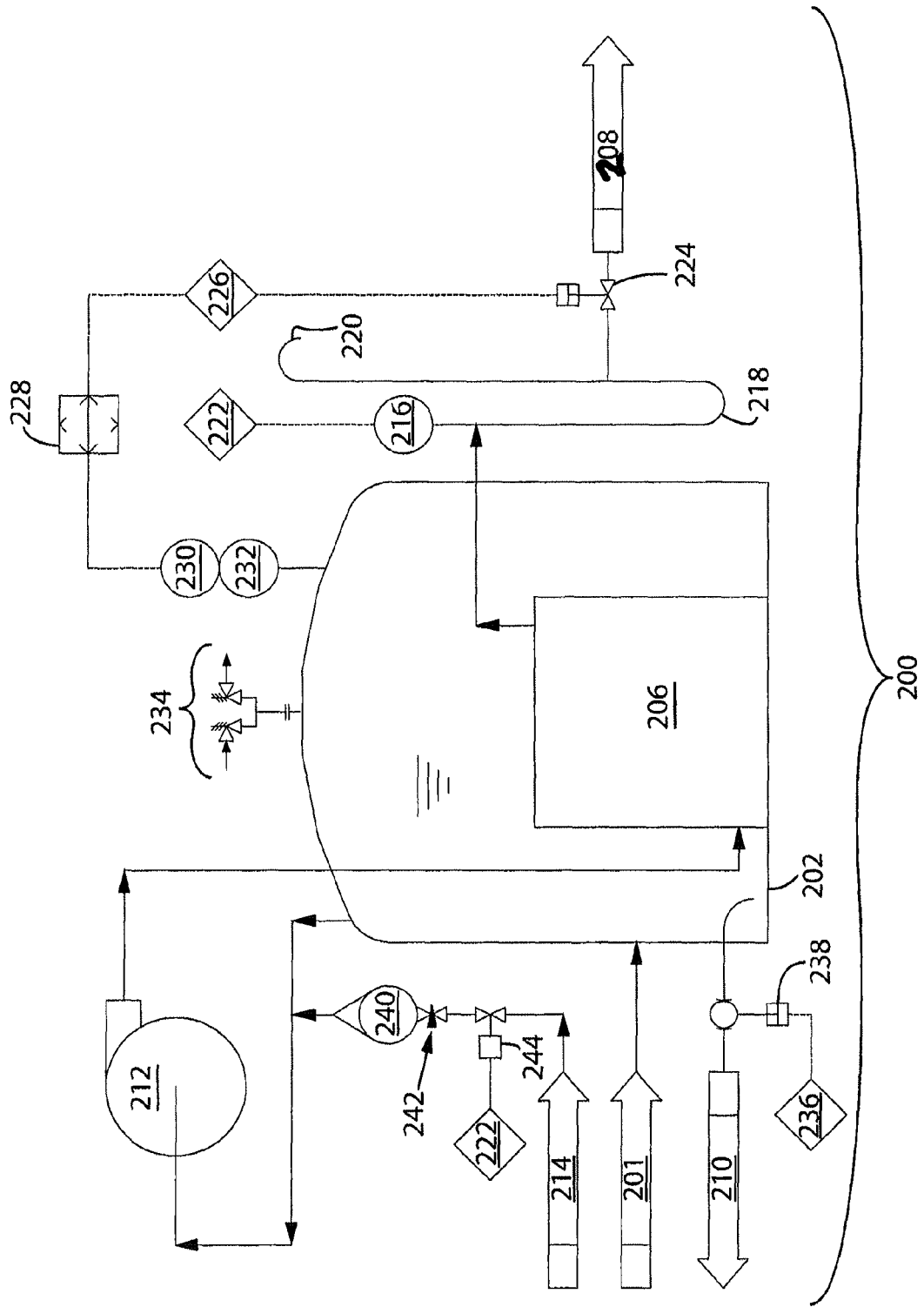
FIG. 3 is a schematic diagram of another embodiment of a filtration system for removing dissolved contaminants from contaminated water.

Referring now to FIG. 3, a filtration system 200 according to another exemplary embodiment of the invention is illustrated. Filtration system 200 is similar to filtration system 100 in that it includes many common elements. It includes a vessel 202 to contain matter under treatment 204 (e.g., water and suspended solids) and also contains a membrane 206. The filtration system 200 is configured to deliver outputs in the form of permeate 208 and waste sludge 210. The vessel 202 is configured to receive water 201 to be treated. A gas recirculator 212 and an air supply 214 are provided. An oxidation-reduction potential (ORP) sensor 216 is provided to sense or measure the ORP of permeate 208. A loop seal 218 is provided at the outlet, and a vent 220 is provided in conjunction with the loop seal 218. Coupled to the ORP sensor 216 is a connection 222 to an air feed controller, and a permeate flow control valve 224 is provided to control the flow of permeate from the filtration system 200. A connection 226 is provided to a tank level control via a level control 228, a level indicating and transmitting device 230, and a level element 232. Additionally, a pressure and vacuum relief 234 is provided at the top of the vessel 202. A desludging valve control connection 236 is provided in conjunction with a desludging valve 238. A flow meter 240, together with a needle valve 242 for fixing the air flow rate, meters the flow of air into the recirculation path. A control valve 244 and a connection at 222 are also provided.

Filtration system 200 differs from system 100 primarily in terms of the location of the sludge removal subsystem. It is moved to the left of vessel 202 in system 200 as illustrated in FIG. 3.

Figure 4:
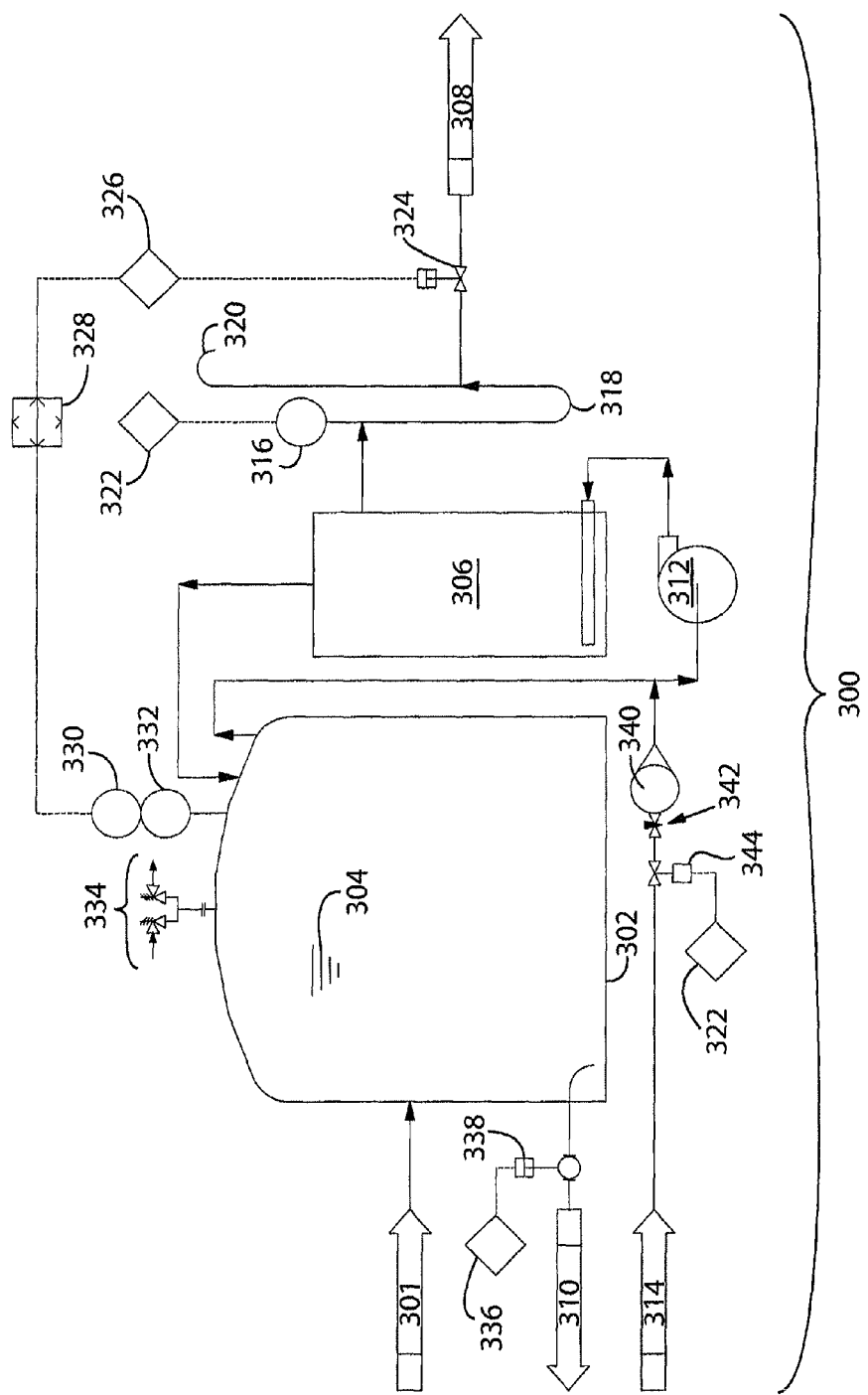
FIG. 4 is a schematic diagram of yet another embodiment of a filtration system for removing dissolved contaminants from contaminated water.

Referring now to FIG. 4, a filtration system 300 according to yet another exemplary embodiment of the invention is illustrated. Filtration system 300 is similar to filtration system 100 and 200 in that it includes many common elements. It includes a vessel 302 to contain water 304 to be treated, and it includes a membrane 306. The filtration system 300 is configured to deliver outputs in the form of permeate 308 and waste sludge 310. The vessel 302 is configured to receive feed water 301. A gas recirculator 312 and an air supply 314 are provided. An oxidation-reduction potential (ORP) sensor 316 is provided to sense or measure the ORP of permeate 308. A loop seal 318 is provided at the outlet, and a vent 320 is provided in conjunction with the loop seal 318. Coupled to the ORP sensor 316 is a connection 322 to an air feed controller, and a permeate flow control valve 324 is provided to control the flow of permeate from the filtration system 300. A connection 326 is provided to a tank level control via a level control 328, a level indicating and transmitting device 330, and a level element 332. Additionally, a pressure and vacuum relief 334 is provided at the top of the vessel 302. A desludging valve control connection 336 is provided in conjunction with a desludging valve 338. A flow meter 340, together with a needle valve 342 for fixing the air flow rate, meters the flow of air into the recirculation path. A control valve 344 and a connection at 322 are also provided.

Filtration system 300 differs from system 100 and system 200 primarily in terms of the configuration of the membrane. Specifically, membrane 306 is external of the vessel 302 in this embodiment and uses a pump or blower 312 to move gas from the head of vessel 302 to the enclosure of the membrane 306. In one exemplary embodiment, membrane 306 includes a sparger or nozzle or other component for directing gas toward the surfaces of the membrane 306 in order to remove or inhibit the accumulation of film or residue on the membrane surface. Gas is then recirculated to the vessel 302 in a substantially or completely closed system, thereby permitting the control of any oxidant introduced into the system.

Figure 5:
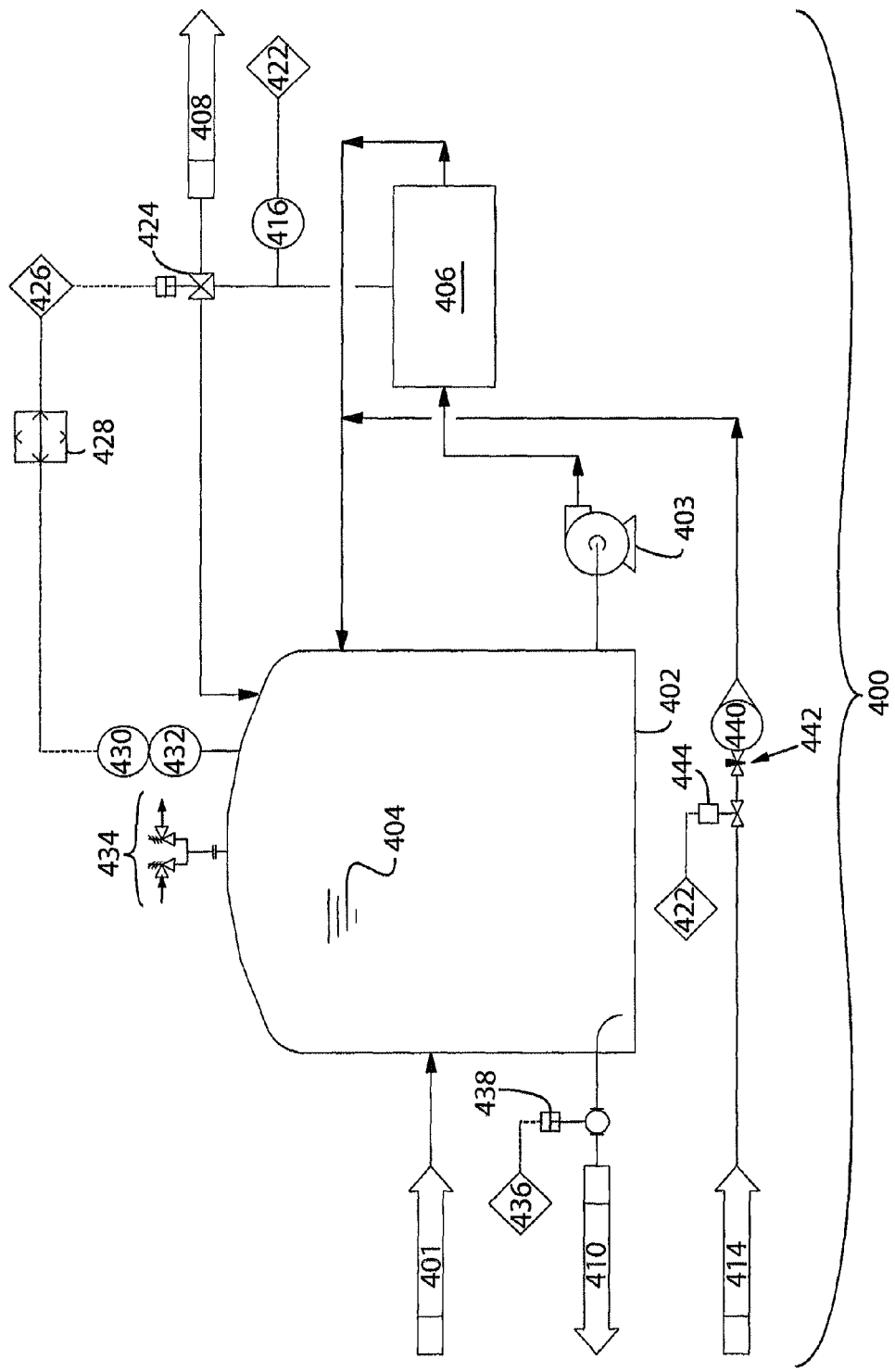
FIG. 5 is a schematic diagram of still another embodiment of a filtration system for removing dissolved contaminants from contaminated water.

Referring now to FIG. 5, a filtration system 400 according to still another exemplary embodiment of the invention is illustrated. Filtration system 400 is similar to filtration systems 100 and 200 and 300 in that it includes many common elements. It includes a vessel 402 to contain water 404 to be treated, and it includes a membrane 406. The filtration system 400 is configured to deliver outputs in the form of permeate 408 and waste sludge 410. The vessel 402 is configured to receive feed water 401. An air supply 414 is also provided. An oxidation-reduction potential (ORP) sensor 416 is provided to sense or measure the ORP of permeate 408. Coupled to the ORP sensor 416 is a connection 422 to an air feed controller, and a permeate flow control valve 424 is provided to control the flow of permeate from the filtration system 400. A connection 426 is provided to a tank level control via a level control 428, a level indicating and transmitting device 430, and a level element 432. Additionally, a pressure and vacuum relief 434 is provided at the top of the vessel 402. A desludging valve control connection 436 is provided in conjunction with a desludging valve 438. A flow meter 440, together with a needle valve 442 for fixing the air flow rate, meters the flow of air into the recirculation path. A control valve 444 and a connection at 422 are also provided.

Filtration system 400 differs from system 100 and system 200 and system 300 primarily in terms of the type of the membrane used and the fluid circulated between the vessel and the membrane, which fluid can be used to scour the membrane or at least inhibit the accumulation of membrane film. Such circulation of fluid (whether liquid or gas) helps maintain the permeability and/or flux of the membrane.

Specifically, membrane 406 is a cross flow membrane. In such a membrane, relatively high velocity flow of recirculating fluid provides the mechanism for scouring the membrane's surface. Specifically, fluid such as received water 404 in vessel 402 is circulated from vessel 402 to the membrane 406 and then back to the membrane by means of a pump 403. Accordingly, the system 400 circulates fluid at higher velocity to the membrane for filtration and concurrent scouring of the membrane's surface. This fluid can be gaseous or liquid according to various embodiments of the invention. If received water 404 is circulated by pump 403, such as in the case of a cross flow membrane, then that liquid recirculation can be conducted in lieu of circulating gas.

In preferred embodiments, the recirculating fluid is recirculating gas that is maintained in a substantially closed system to control ORP; therefore, it is beneficial to use bioreactor headspace air instead of air in an MBR. Also, anoxic conditions are preferably controlled by a small oxidant feed such as air feed. Such systems provide economical single step treatment to remove Se; remove TSS; reduce COD, BOD and TOC; and/or concentrate solids and biomass and Se in a small concentrated sludge discharge. Also, such systems may be less expensive in terms of operation and capital, may have a smaller footprint thus saving valuable real estate, may have fewer unit operations and thus simpler to operate, and may provide complete removal of TSS and solids Se (i.e., have a very high filtration efficiency).

As will be appreciated based on the foregoing description of preferred embodiments of the invention, this invention provides a system that can be configured to economically filter water, such as water treated in a bioreactor such as a fluidized bed reactor, in a controlled anoxic mode utilizing membrane systems like those that employ cross flow to maintain permeability or flux through the membrane. For example, this invention optionally uses cross flow membranes with no gas feed in a controlled anoxic mode. These would generally be external tubular membranes, and high velocity flow across the membrane surface is used to maintain flux. Such membranes are typically used in connection with a high recirculation rates. For example, the recirculation to feed (or net throughput) ratios can vary widely, but a 50:1 ratio may be typical. A chemical oxidant or oxygen is optionally added to the recirculating stream to control ORP in the filtration system such as an MBR.

It also provides a system that can be configured to biologically polish effluent from the bioreactor in such a way as to reduce the amount of COD, BOD, TOC, solids waste volume and mass of solids. If used in conjunction with a bioreactor, the bioreactor is optionally a fluidized bed reactor (FBR). Such an FBR may be of any type, including aerobic, anoxic, and anaerobic bioreactors. Accordingly, an anoxic filtration system such as an MBR would provide polishing for TSS and COD/TOC/BOD reduction and/or secondary treatment for denitrification, perchlorate destruction, etc. Alternatively, the filtration system is optionally used as a standalone anoxic bioreactor.

In the detailed description, embodiments of this invention are described for removal of selenium. Although this invention is beneficially used for such removal of selenium, it is also beneficially used for the removal of other dissolved or undissolved contaminants, and especially beneficial for the removal of those contaminants that are water soluble at concentrations above any required treatment levels and are biologically converted to a solid form or degraded under anoxic conditions.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A system for treating contaminated water for the removal of dissolved contaminants, the system comprising:
    a bioreactor configured to operate in an anoxic mode and having an outlet for treated water; and
    a filter coupled to receive treated water from the outlet of the bioreactor, the filter being configured to operate in an anoxic mode to control the oxidation-reduction potential of the treated water, the filter having
    (a) a vessel configured to receive the treated water,
    (b) a membrane associated with the vessel and positioned to extract permeate from the received water,
    (c) a fluid outlet positioned to direct fluid toward the membrane to inhibit film build up on the membrane,
    (d) a fluid recirculator positioned to recirculate fluid between the vessel and the fluid outlet, and
    (e) an oxidant supply positioned to introduce an oxidant into the vessel, the oxidant supply being adjustable to control the oxidation-reduction potential of the received water in the vessel within a predetermined range.

2. The system of claim 1, the bioreactor being a liquid bioreactor.

3. The system of claim 2, the liquid bioreactor being a fluidized bioreactor.

4. The system of claim 3, the fluidized bioreactor being a fluidized bed reactor.

5. The system of claim 1 being configured to remove dissolved selenium from the received water and to maintain the predetermined range of oxidation-reduction potential at −100 to −300 mV.

6. The system of claim 1, further comprising a sensor positioned to measure the oxidation-reduction potential representative of that of the received water in the vessel.

7. The system of claim 6, the sensor being positioned to measure the oxidation-reduction potential in the permeate.

8. The system of claim 6, the sensor being positioned to measure the oxidation-reduction potential in the received water.

9. The system of claim 1, the membrane being an internal membrane positioned at least partially within the vessel.

10. The system of claim 1, the membrane being an external membrane positioned outside of the vessel.

11. The system of claim 1, the fluid outlet being positioned to induce cross flow of received water to reduce degradation of the permeability of the membrane.

12. The system of claim 1, the fluid recirculator being configured to recirculate fluid including gas from a headspace above the received water in the vessel.

13. The system of claim 1, the vessel including an inlet for receiving an electron donor.

14. The system of claim 1, the vessel including an inlet for receiving a nutrient.

15. The system of claim 1, the vessel being a mixed vessel.

16. The system of claim 1, the vessel being a bioreactor.

17. The system of claim 1, the fluid outlet being configured to direct a gas toward the membrane to inhibit film build up on the membrane.

18. The system of claim 1, the fluid outlet being configured to direct received water toward the membrane to inhibit film build up on the membrane water.

19. The system of claim 1, the fluid recirculator being configured to recirculate gas between the vessel and the fluid outlet.

20. The system of claim 1, the fluid recirculator being configured to recirculate received water between the vessel and the fluid outlet.

21. The system of claim 1, the oxidant supply being configured to introduce an oxidant gas into the vessel.

22. The system of claim 21, the oxidant supply being configured to introduce air into the vessel.

23. A method for removing dissolved contaminants from contaminated water, the method comprising the steps of:
(a) receiving contaminated water in a vessel;
(b) separating permeate from the received water using a membrane associated with the vessel;
(c) directing fluid toward the membrane to inhibit film build up on the membrane from a fluid outlet;
(d) recirculating fluid between the vessel and the fluid outlet; and
(e) maintaining an anoxic mode in the vessel by controlling the introduction of an oxidant to the vessel to control the oxidation-reduction potential of the contaminated water in the vessel as needed.

24. The method of claim 23, the receiving step (a) including receiving treated water from a bioreactor.

25. The method of claim 23, the directing step (c) including inducing cross flow of received water to reduce degradation of the permeability of the membrane.

26. The method of claim 23, the recirculating step (d) including recirculating fluid including gas from a headspace above the received water in the vessel.

27. The method of claim 23 configured for removing dissolved selenium from the received water, the maintaining step (e) including maintaining the oxidation-reduction potential of the contaminated water in the vessel between $-100$ to $-300$ mV.

28. The method of claim 23, the maintaining step (e) including measuring an oxidation-reduction potential of a line of contaminated water pumped into and out of the vessel and adjusting the introduction of the oxidant to the vessel to maintain the oxidation-reduction potential.

29. The method of claim 23, the maintaining step (e) including measuring the oxidation-reduction potential of the permeate.

30. The system of claim 1, wherein the fluidized bioreactor is a fluidized bed reactor and the filter is a membrane bioreactor.

31. The system of claim 1, the filter being configured to provide intermittent back flushes.

* * * * *